(12) United States Patent
Ramaswamy

(10) Patent No.: US 11,718,165 B2
(45) Date of Patent: Aug. 8, 2023

(54) CARGO STORAGE ASSEMBLY FOR SPORT UTILITY VEHICLE

(71) Applicant: Isaac Ramaswamy, Patchogue, NY (US)

(72) Inventor: Isaac Ramaswamy, Patchogue, NY (US)

(*) Notice: Subject to any disclaimer, the term of this patent is extended or adjusted under 35 U.S.C. 154(b) by 217 days.

(21) Appl. No.: 17/119,262

(22) Filed: Dec. 11, 2020

(65) Prior Publication Data

US 2021/0094397 A1 Apr. 1, 2021

Related U.S. Application Data

(63) Continuation of application No. 16/146,163, filed on Sep. 28, 2018, now Pat. No. 10,875,393.

(60) Provisional application No. 62/564,315, filed on Sep. 28, 2017.

(51) Int. Cl.
*B60J 7/19* (2006.01)
*B60J 7/14* (2006.01)
*B62D 65/02* (2006.01)

(52) U.S. Cl.
CPC .............. *B60J 7/19* (2013.01); *B60J 7/141* (2013.01); *B60J 7/196* (2013.01); *B62D 65/02* (2013.01)

(58) Field of Classification Search
CPC ... B60J 7/141; B60J 7/19; B60J 7/196; B62D 65/02
See application file for complete search history.

(56) References Cited

U.S. PATENT DOCUMENTS 5,538,306 A 7/1996 Ament

FOREIGN PATENT DOCUMENTS

CA 3004864 A1 * 1/2019 .............. B60J 7/085

* cited by examiner

*Primary Examiner* — Dennis H Redder
*Assistant Examiner* — Melissa Ann Bonifazi
(74) *Attorney, Agent, or Firm* — Harris Beach PLLC

(57) ABSTRACT

A Jeep® cargo enclosure device is comprised of two [left/right] side-arm panels which allow for mounting of the two-part enclosure panels from the rear and toward the front seats of the vehicle, a single rear sliding cargo panel to enclose the space behind the back seat to the tailgate of the vehicle, a four-section hinged top cover panel to enclose the space in front of the rear sliding cargo panel and up to the front seats of the vehicle, and a single additional forward enclosure panel to discourage access from the front of the vehicle when its doors have been removed. All components of this cargo enclosure device work in accord with and without impediment to all ordinary functions of the Jeep® vehicle while installed, including the operation of the soft-top, the use of the vehicle's back seat, and the ability to carry taller cargo items.

18 Claims, 10 Drawing Sheets

CARGO STORAGE ASSEMBLY FOR SPORT UTILITY VEHICLE

BACKGROUND

1. Technical Description

The present disclosure is directed to cargo/trunk devices and, more particularly, to a cargo cover assembly for securing the cargo area of, e.g., a Jeep Wrangler® type vehicle when the soft top feature is moved to convertible (open) form.

2. Background of Related Device

The Jeep Wrangler® is a popular model convertible SUV vehicle which utilizes both, a hard-top and soft-top convertible cover. The assembly of the present disclosure is for use with the Jeep® vehicle's factory soft-top cover. The hard-top cover, when in use, poses no security issue for materials held inside the vehicle's trunk/cargo space since it is lockable and reasonably secure to the standard of any ordinary vehicle in its class. The soft-top cover, however, imposes certain security risks—particularly when it is used in its various "open" applications in which either some or all of the side and rear window panels are removed and even more so if the soft convertible style top is completely opened—leaving any items in the trunk/cargo space vulnerable to damage and/or theft.

Typically, the Jeep® soft-top cover is converted or opened from an enclosed configuration to an open condition to provide an open air convertible experience in the use and appearance of the vehicle. In the open condition, the rear seat cargo space behind the front seats is left open and thereby vulnerable to access by potential intruders. This prevents the user from leaving any items that would otherwise be safely kept in said rear seat cargo space when the top is in the enclosed position.

Additionally, in the 2-door Jeep® models, many users will remove the entire rear seat in order to obtain more usable cargo space. When the soft-top is in open condition, this type of use is compromised even more so by the vulnerability of the open space. Jeep® owners are often caused to not utilize the full convertible and cargo carrying functions of the Jeep® vehicle due to the risk concerns described herein.

There are a few products on the present market that attempt to address the security concerns of the Jeep® cargo space while the vehicle is in use with the soft-top removed, i.e. in an open condition. These include: cargo netting systems, which simply hold items in place yet do little to prevent access or intrusion; and rear cargo enclosure systems that may need to be permanently installed—thereby: (a) limiting access to the entire cargo space front to back and/or top to bottom, (b) limiting (or precluding) the ongoing enclosure and/or deployment of the soft-top, (c) limiting (or precluding) the use of the vehicle's rear seat.

A continuing need exists in the market for a Jeep® cargo enclosure device configured to better secure the trunk cargo space which functions without limiting or precluding the use of the vehicle's other standard features such as the full operation of the soft-top, the use of the rear seat, and the use of the entire cargo space (front to back and top to bottom) when needed to carry larger/taller cargo.

The need also exists for such a device to be installed and removed easily without compromising any part of the body/structure of the vehicle, thereby capable of being used on leased vehicles due to restrictions on drilling into or otherwise "changing" the appearance or structure of the vehicle.

SUMMARY

In accordance with one aspect of the present disclosure, a cargo enclosure assembly for e.g., a Jeep Wrangler®, is provided. The cargo enclosure assembly includes first and second side arms with each side arm configured to be secured to the respective sides of a vehicle, preferably, to pre-existing holes in the vehicle frame. The side arms have forward and rear segments with the rear segments each defining internal grooves. The assembly further includes a rear cargo cover having edges correspondingly dimensioned to be received within the internal grooves of the first and second arms. The rear cargo cover is slidably mounted relative to the first and second arms via reception of the edges of the rear cargo cover and the internal grooves of the first and second arms to permit movement of the rear cargo cover between a rear open position permitting access to a trunk cargo space of the vehicle and a forward closed position enclosing the trunk cargo space.

A rear cross-bar may be mountable to the rear segments of the first and second arms. The cross bar may define an internal groove configured for reception of a forward edge of the rear cover. In the forward closed position of the rear cover, the rear cargo cover abuts the rear seat thereby providing no avenue for intrusion into the trunk cargo space.

The enclosure assembly may include a forward or front cover configured for installation over the rear seating area of the vehicle when the rear seat has been removed or in a stowed condition. In an aspect, the forward cover includes a forward cross-bar which is securable to the forward segments of the first and second arms.

The front cover may include a plurality of panels foldably connected to each other. A forward most panel of the front cover may be secured to the forward cross-bar. The front cover may be configured to extend to the rear cross-bar thereby enclosing the rear seating area of the vehicle. A locking mechanism for securing a rear panel of the front cover relative to either the rear cargo cover or the rear cross-bar may be provided, thereby preventing movement of the front cover to the folded condition.

The assembly may include a lower cover adapted to be secured relative to the front cross bar. The lower cover is configured to prevent frontal access to the rear seat cargo space of the vehicle if, e.g., the doors of the Jeep® are removed. The lower cover extends downwardly from the front cross-bar toward the floor of the vehicle.

A method for securing a vehicle cargo area of a Jeep® vehicle having sides with predrilled factory holes for securing a hard top of the vehicle is disclosed. The method includes the steps of mounting first and second side arms of a vehicle closure assembly to respective sides of the vehicle by passing fasteners through openings in the side arms and the predrilled openings on the sides of the vehicle, and securing a rear cargo cover of the vehicle closure assembly to the first and second arms to enclose a trunk cargo space of the vehicle.

In embodiments, one of the rear cargo cover and the first and second arms includes a groove and the other of the rear cargo cover and the first and second arms includes a tongue, and wherein securing the rear cargo cover includes sliding the rear cargo cover relative to the first and second arms through reception of the tongues within the grooves.

In an exemplary embodiment, a rear cross bar is mountable to the first and second arms, and wherein securing the rear cargo cover includes coupling the rear cargo cover with the rear cross-bar.

The method may include installing a front cover within the rear seat cargo space of the vehicle. The front cover may include a front cross-bar wherein installing the front cover includes securing the front cross bar to the first and second arms. In certain embodiments, the front cover includes a plurality of panels foldably connected to each other. A forward most panel of the plurality of panels is connected to the front cross-bar. The method may further include transition of the panels to an unfolded or enclosed condition to secure the rear seat cargo space of the vehicle.

The method may further include securing a rear most panel of the front cover relative to either the rear cross bar or the rear cargo cover to secure the panels in the unfolded or enclosed condition thereof. In embodiments, securing the rear most panel is performed with a locking mechanism.

The method may further include securing a lower cover to the front cross-bar to prevent access to the rear seating area from a front of the vehicle. In some embodiments, securing the lower cover includes positioning the lower cover to extend downwardly at a 90 degree angle from the forward cross-bar toward the floor of the vehicle.

One aspect of the disclosure is directed to a Jeep® rear cargo enclosure device including two side-arm panels which secure to the vehicle's sidewalls, a rear sliding cargo cover to secure the smaller area behind the vehicle's rear seat, and a larger top cargo cover to secure the entire cargo space which is left open when the rear seat has been removed. The two side-arm panels each define a left and right composition formed of, e.g., a plastic material. The side arms each function as a singular unit on either side (left and right) of the vehicle, have an upper surface to which the cover apparatuses will adjoin, a lower surface which will contact and affix to the vehicle directly without marking or compromising it, and will be form-fitted to the curvature of the vehicle's original dimensions. The rear sliding cargo cover will function in unison with the two side-arm panels and be supported on either side by a tongue & groove construction to easily install into or remove from the vehicle. The rear sliding cover has a length and width to position snugly between the affixed left and right side-arm panels. The larger top cargo cover will function by attaching at its rear to a cross-bar which adjoins the left and right side-arm panels and attaching at its front directly to the left and right side arms. The incorporation of the larger top cargo cover would only be required when the vehicle's rear seat has either been removed or folded into the stowed position, thereby producing a need for covering/securing the larger cargo space. The rear seat may not be used for passenger seating while the larger top cargo cover is in use, however, it need not be removed from the vehicle as is the case in other designs of this device by other manufacturers.

In embodiments in which the vehicle's rear seat is in use, the rear sliding cargo cover requires no "installation" per se which would require tools. The rear sliding cargo cover will simply slide into the grooves at the sides of the left and right side-arm panels and abut the seat back of the rear seat while it is in the upright and locked position.

In certain embodiments, in which the vehicle's rear seat is NOT in use, the rear sliding cargo cover requires only minimal "installation" requiring only two screws. The rear sliding cargo cover will simply slide into the grooves at the sides of the left and right side-arm panels and rest into the groove of the rear cross-bar which is affixed to the rear of the left and right side-arm panels using only the two screws.

In certain embodiments, the entire rear cargo space [front to back and top to bottom] can easily be accessed and/or be utilized by simply sliding out the rear sliding cargo cover and removing only the rear cross-bar thereby leaving the entire cargo area completely unobstructed by any part of the device.

In all embodiments, the left and right side-arm panels would never need to be removed from the vehicle for any purpose or function [i.e., use of the soft-top, use of the rear seat, carrying larger cargo] of the vehicle to be utilized.

In some embodiments in which the rear seat has been removed or locked into stowed position, the larger hinged top cargo cover may be utilized to secure the open space in the cargo area.

In certain embodiments, the larger hinged top cargo cover is locked into place at the vehicle front by a front cross-bar that bolts directly into each of the affixed left and right side-arms using only two screws.

In some embodiments, the larger hinged top cargo cover rests directly on top of the left and right side-arms due to the dimensions of the larger top cargo cover being wider at each edge than the internal width of the space between the left and right side-arms.

In some embodiments, the larger hinged top cargo cover is supported by three joist supports which drop into slots at the front and rear cross-bars.

In some embodiments, all three joist supports may be used, while in other embodiments, it may be necessary to use only the two outer joist supports or even just the one center joist support.

In some embodiments, the larger hinged top cargo cover is locked into place by a hook & latch or similar locking device at the rear cross-bar affixed at the rear of the two side panels.

In some embodiments, the larger hinged top cargo cover has an additional forward panel affixed at its front cross-bar in order to prevent access to the cargo space from the front of the vehicle. This is particularly needed when the vehicle's front doors have been removed (as is a common practice with the Jeep Wrangler® two-door models)

In some embodiments, this additional forward panel spans the entire width of the cargo space as measured from left side arm panel to right side-arm panel.

In some embodiments, this additional forward panel spans in height from just above the vehicle floor to the top of the front cross-bar of the larger top cargo cover.

In some embodiments, the larger hinged top cargo cover may be folded from vehicle rear toward vehicle front at each of its piano-hinged sections in order to access the cargo space at varying sized openings from small to large.

In some embodiments, the larger hinged top cargo cover may be folded from vehicle rear toward vehicle front completely without removing it in order to access the entire cargo space.

In some embodiments, the entire larger hinged top cargo cover is able to rest in folded or unenclosed (open) position atop the left and right side-arms in order to give ready access to the cargo space when securing the cargo area is not required.

In some embodiments, the entire larger hinged top cargo cover can easily be removed whenever the rear seat needs to be utilized for the carrying of passengers.

In certain embodiments, the body of the larger hinged top cargo cover is formed of one quarter-inch plastic and uses three piano hinges to adjoin its four top/cover sections.

In certain embodiments, the front of the larger hinged top cargo cover has a fourth hinge connecting the front cross bar which is used to affix the entire larger hinged top cargo cover directly to the left and right side-arm panels.

In certain embodiments, all hinges associated with this device are formed of stainless steel.

In certain embodiments, the body of the front cross-bar is formed of one and half-inch by one and half-inch plastic or aluminum.

In certain embodiments, the body of the two side arms is formed of one and half-inch plastic.

In certain embodiments, the body of the sliding rear cargo cover is formed of one-inch plastic.

In certain embodiments, the body of the rear cross-bar is formed of 1.5-inch by 1.5-inch plastic.

In certain embodiments, the body of the additional forward panel is formed of one quarter-inch plastic.

In certain embodiments, there is a locking hook & latch type device to adjoin/secure the larger top cargo cover to the rear cross-bar.

In certain embodiments, three joist supports are formed of one eighth-inch aluminum which measure the distance from the front to the rear cross-bars on the device and are evenly spaced into slots across the width of the larger hinged top cargo cover between the left and right side-arms of the device.

In embodiments, the entire device includes ten bolts; four bolts [two each side] to secure each of the side-arm panels to existing holes in the vehicle's upper sidewalls; two bolts to secure the rear cross-bar, two bolts to secure the front cross-bar when using the larger top cargo cover, and two bolts if using the additional forward panel.

Other features of the present disclosure will become readily apparent by the following description.

BRIEF DESCRIPTION OF THE DRAWINGS

Various exemplary embodiments of the presently Jeep® cargo storage device are described herein below with reference to the drawings, wherein.

DETAILED DESCRIPTION OF EMBODIMENTS

Figure 1:
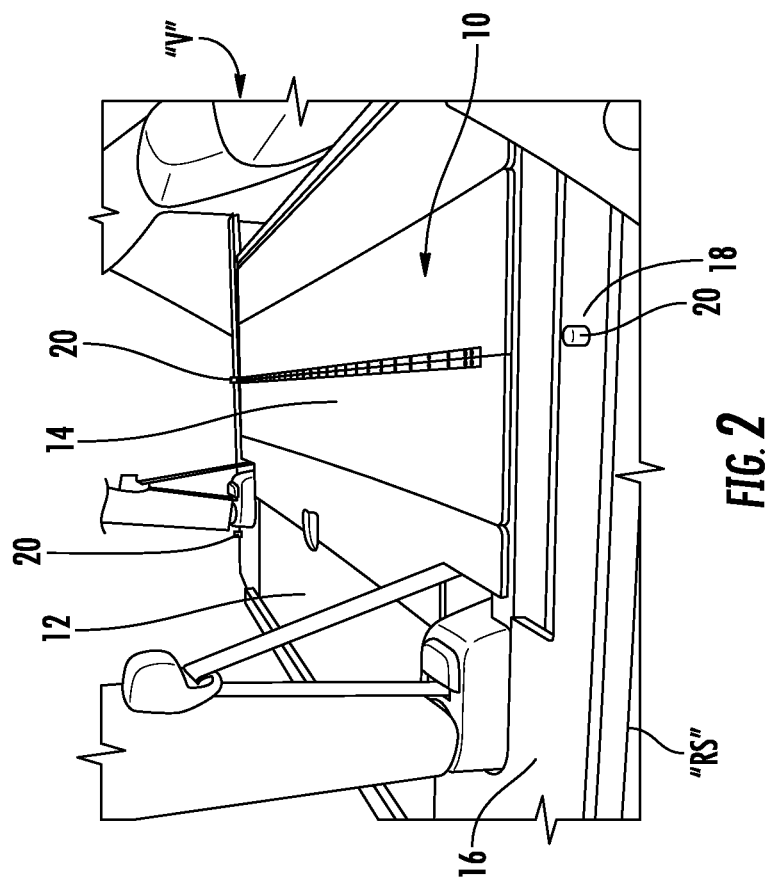
FIGS. 1-2 are perspective views illustrating the cargo enclosure assembly in accordance with the principles of the present disclosure.

The presently disclosed cargo enclosure assembly will now be described in detail with reference to the drawings in which like reference numerals designate identical or corresponding elements in each of the several views. However, it is to be understood that the disclosed embodiments are merely exemplary of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The cargo enclosure assembly is intended to totally enclose a vehicle cargo area for a vehicle such as the Jeep Wrangler®. More specifically, the vehicle cargo assembly secures the trunk cargo area, e.g. behind the rear seat of the vehicle, the rear seat cargo space when the rear seat is removed or being stowed, and optionally the front of the vehicle when the doors of the vehicle have been removed. The cargo enclosure assembly absolutely requires no modification to the frame of the vehicle, no drilling of holes in the sides or drilling of holes in floor of the vehicle. The cargo enclosure assembly is readily installed by using the existing factory holes of the vehicle present, which attach the hard top of the vehicle to the vehicle's frame.

Referring now to FIG. 1, there is illustrated the cargo enclosure assembly 10 installed on a Jeep Wrangler® vehicle "v" with the soft top removed. As shown both the rear trunk area cargo space (hereinafter "trunk cargo space") and the rear seat area cargo space (hereinafter "rear seat cargo space") which is forward of the trunk cargo space are enclosed, thereby providing a completely enclosed compartment preventing access to the rear of the Jeep® vehicle even in the absence of the soft top. In general, the assembly 10 includes a rear cargo cover 12 enclosing the trunk cargo space of the vehicle and a front cover 14 which encloses the rear seat cargo space of the vehicle "v".

Figure 2:
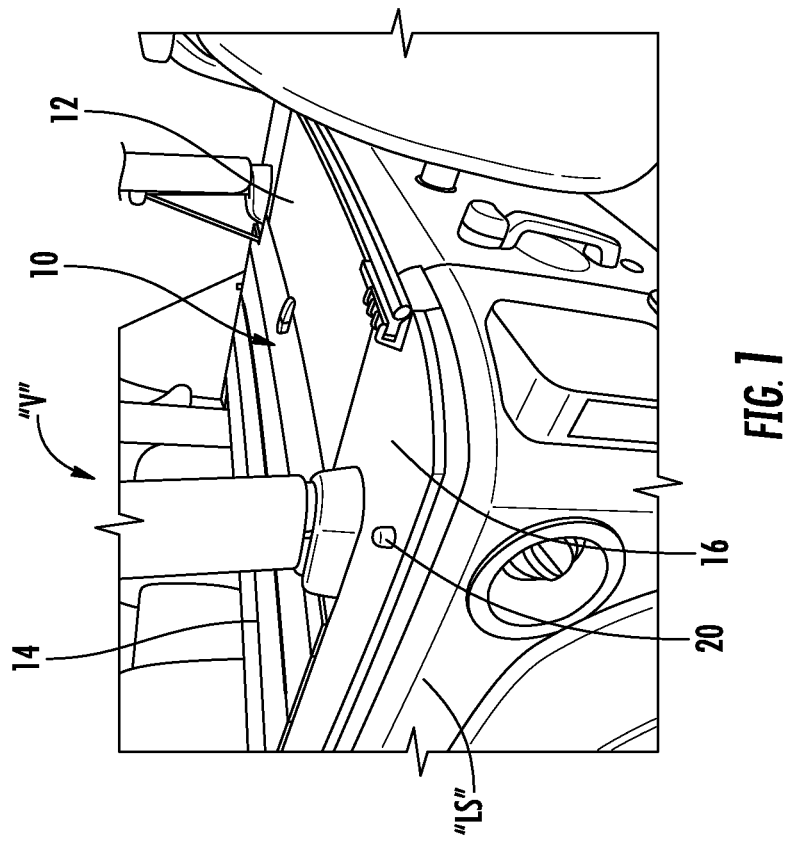
Figure 3:
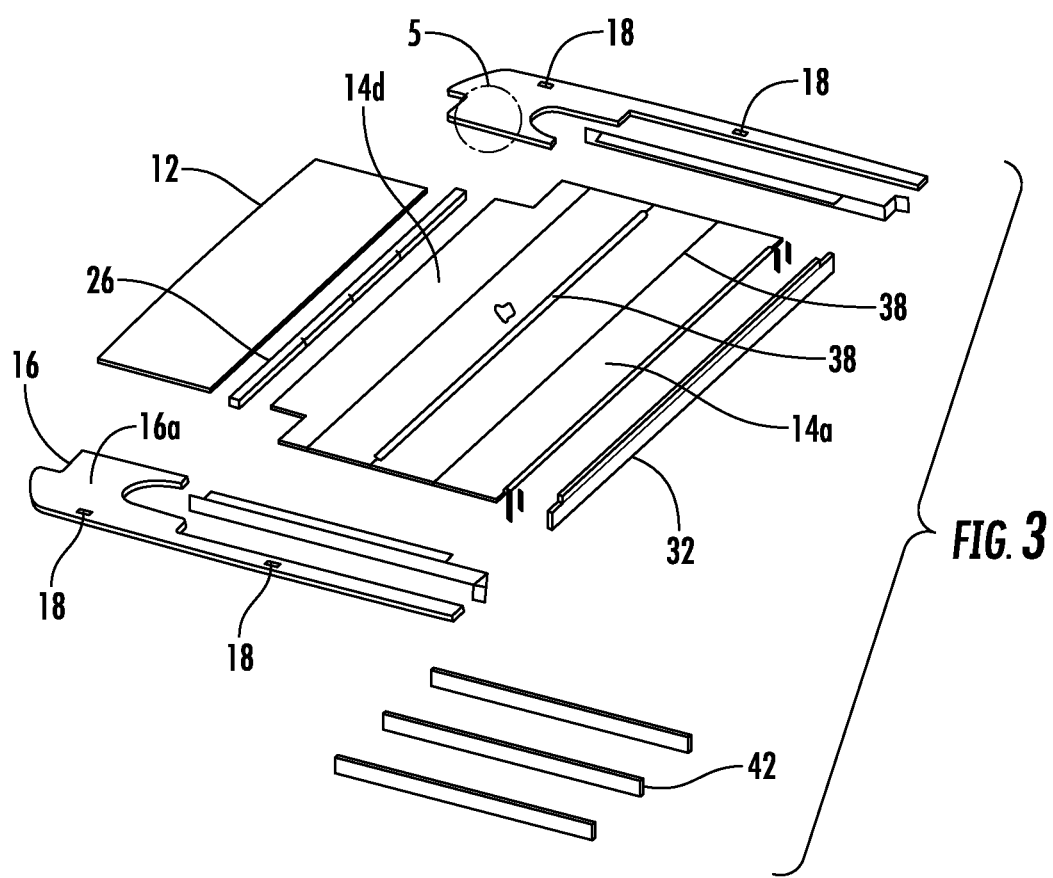
FIG. 3 is an exploded perspective view of the cargo enclosure assembly illustrating the components thereof.
Figure 4:
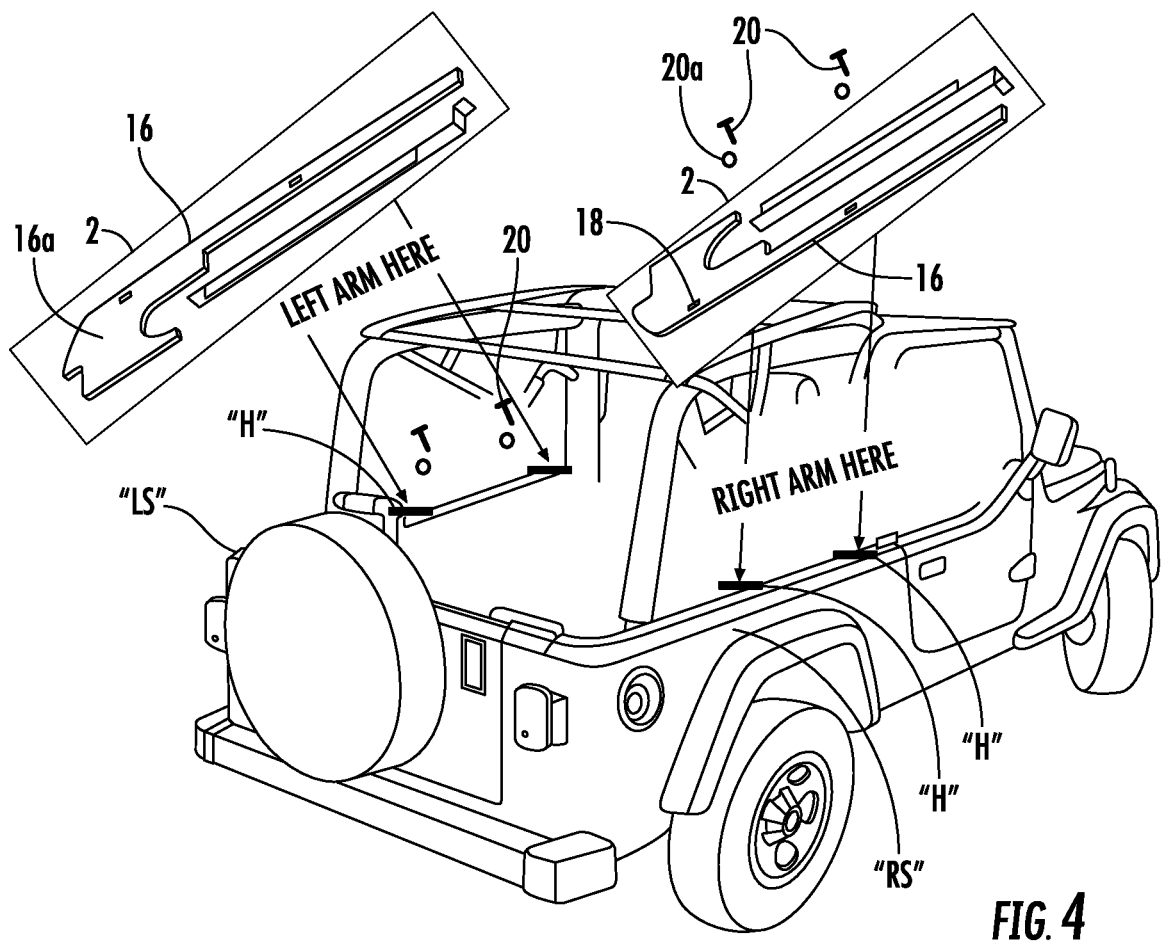
FIG. 4 is a perspective view illustrating mounting of the side arms of the cargo enclosure assembly relative to the frame of the vehicle.

Referring now to FIGS. 1-4, the assembly includes a plurality of parts which can be mounted relative to the vehicle without any modification to the vehicle. The assembly includes two side arms 16 (left and right side arms) which are the only components directly connected to the frame of the vehicle "v". The side arms 16 are directly mountable to the left and right sidewalls "ls", "rs" of the vehicle "v". The two side arm 16 are configured to follow the arrangement and design of the Jeep Wrangler®, e.g., matches the side walls and curvature of the side walls "ls", "rs" and the roll bars "r". In FIG. 3, the two side arms 16 are depicted as two components; however, in certain embodiments they are each a single component. FIG. 4 is a view illustrating the installation of the two side arm 16 on the left and right sidewalls "ls", "rs" of the vehicle "v". As shown, the side arms 16 have apertures 18 (See also FIG. 3) which align with the pre-existing holes or openings (identified schematically as "h") in the side walls "ls", "rs". It should be noted that these factory pre-drilled holes (e.g., two on each side wall) exist to accommodate the fixture of the Jeep® vehicle's hard-top. The side arms 16 are placed on the vehicle sides "ls", "rs" and the apertures 18 of the side arms 16 are aligned with the holes "h" in the side frames of the vehicle. Fasteners such as bolts 20 or the like are introduced through the apertures 18 of the side arms 16 and the pre-existing holes "h" in the frame of the walls "ls", "rs" of the vehicle "v" and tightened (via threaded nuts 20a) to secure the side arms 16 to the vehicle's sides "ls", "rs". In FIGS. 1-2, the apertures 18 in the side arms 16 and the bolts 20 (and associated nuts 20a) coupling the side arms 16 to the vehicle "v" are visible.

The two side arms 16, once affixed, will not impede upon any functions (i.e., enclosure & deployment of the vehicle's soft-top, the use of the vehicle's rear seat in either stowed or upright position, the carrying of passengers in the rear seat) of the Jeep® vehicle [apart from the re-installation of a factory hard-top, which negates the need for this enclosure device] and thereby it is envisioned that they will not need to be removed until use of the Jeep® cargo enclosure device is completely discontinued. It is also envisioned that those who employ the vehicle's soft-top (as many Jeep® owners prefer) will maintain the constant fixture of the side-arm panels 2 since they are both, functional and aesthetically pleasing.

Figure 5:
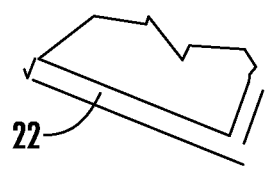
FIG. 5 is an enlarged view of the area of isolation depicted in FIG. 3 illustrating the grooves in the side arms.
Figure 7:
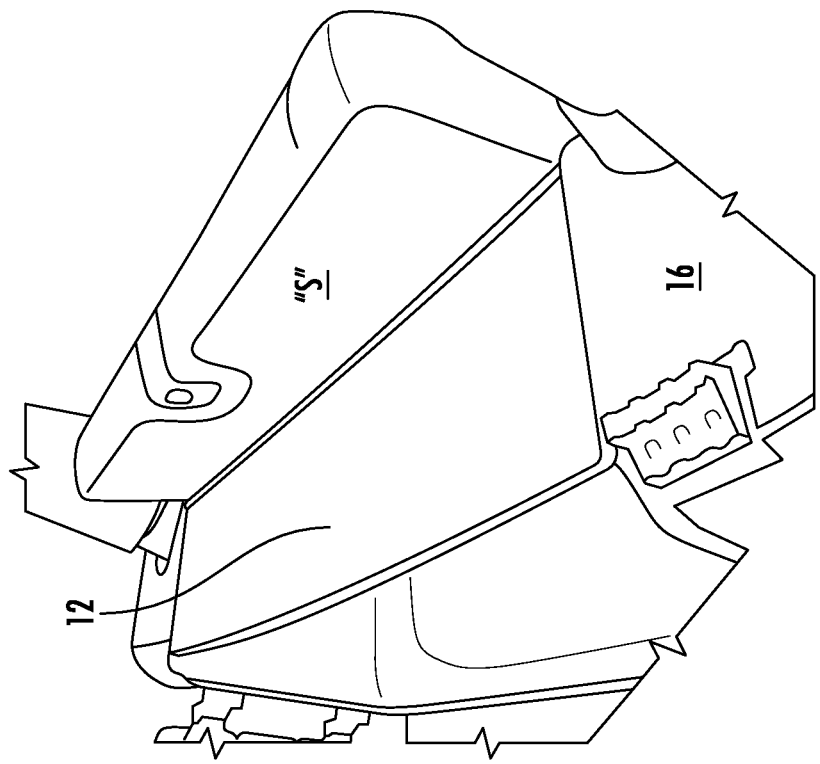
FIGS. 6-7 are perspective views illustrating mounting of the rear cargo cover to the vehicle to enclose the trunk cargo space.
Figure 6:
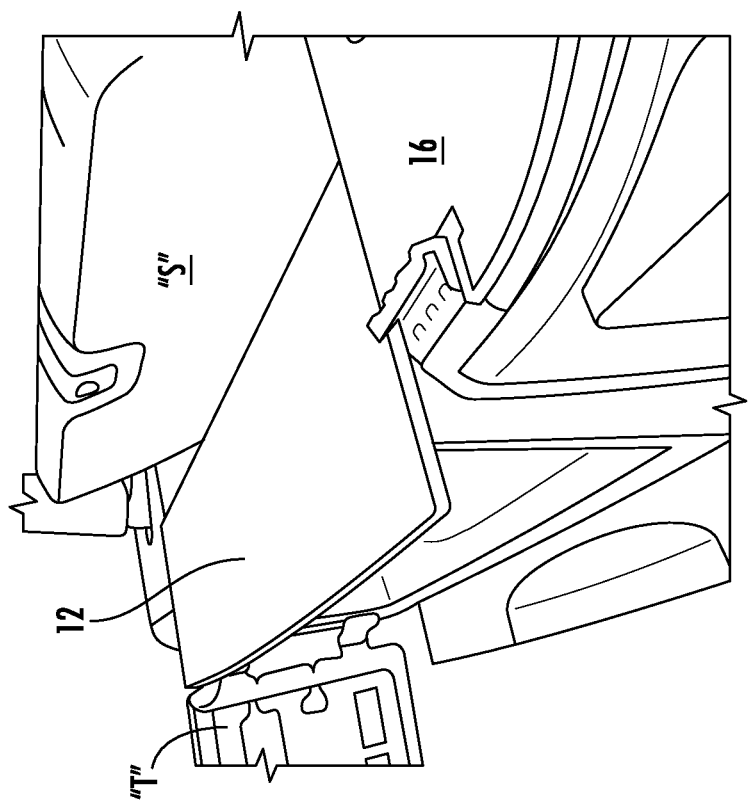

The two side arms 16 each have internal grooves 22 (see the cut-away area of isolation depicted in FIG. 5) in the rear segment 16a of the side arms 16 adjacent the trunk cargo space. The grooves 22 of the side arms 16 receive the rear sliding cargo cover 12, e.g., the tongues 24 on the peripheral edges (FIG. 8) of the cargo cover 12, in sliding relation. Thus, the rear cargo cover 12 can be mounted to the side arms 16 through the reception of the tongues 24 of the rear cargo cover 12 within the grooves 22 of the side arms 16 and advanced toward the rear seat "s"—the advancement being depicted in FIGS. 6-7. Upon complete installation, the forward edge of the rear cargo cover 12 will abut the rear seat "s" of the vehicle when in the upright position of the rear seat "s" (FIG. 7), thereby preventing any access to the trunk cargo space. Specifically, the rear cargo space is enclosed via the seat "s", the rear cargo cover 12 and the trunk "t" of the vehicle "v" when the trunk "t" is closed. As an alternative, the rear cargo cover 12 may include grooves on its side edges and the rear segment 16a of the side arm 16 could contain tongues receivable within the grooves to permit sliding movement of the rear cargo cover 12 relative to the side arms 16.

Figure 8:
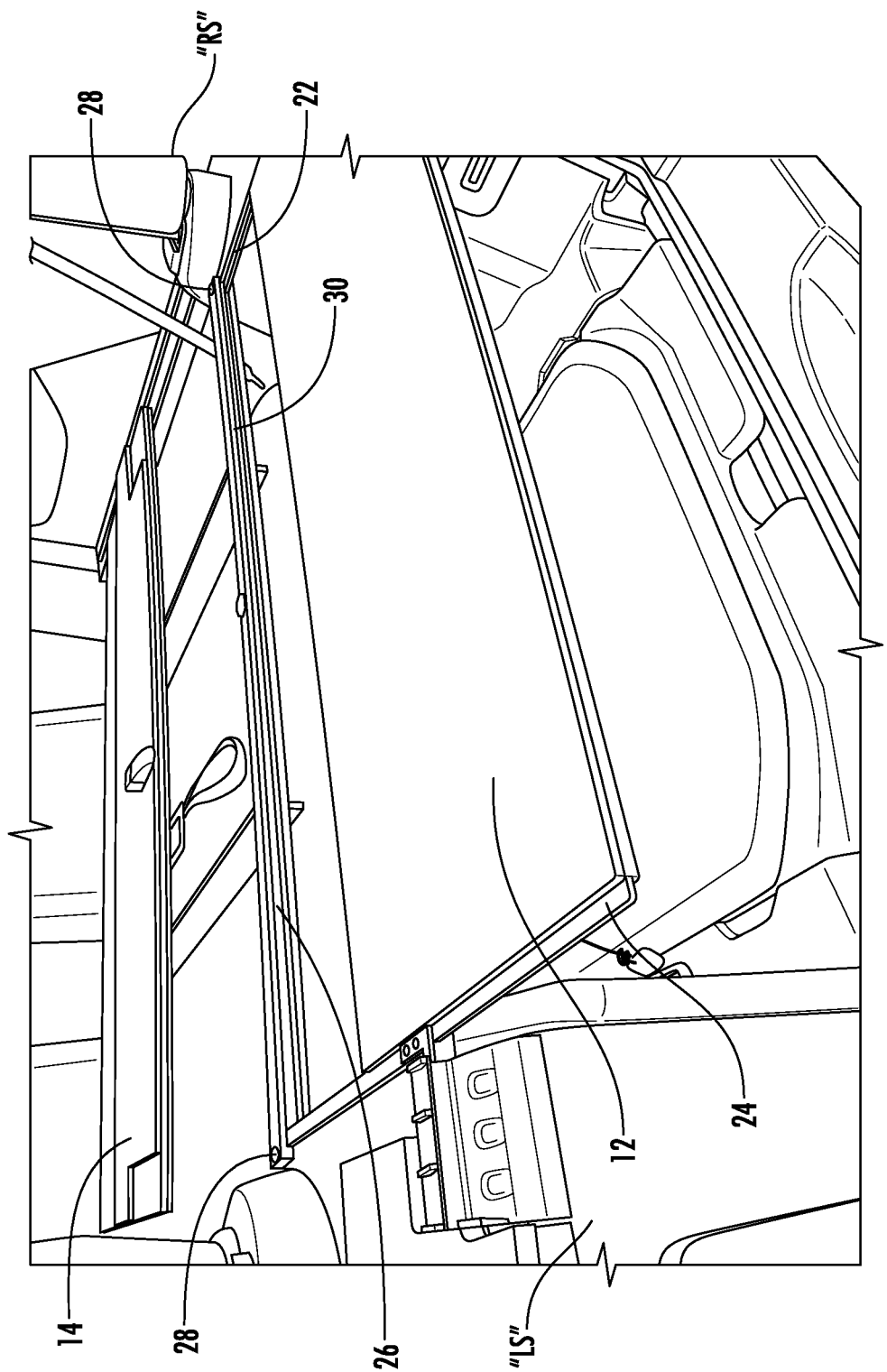
FIG. 8 is a perspective view illustrating the rear cross-bar mounted to the side arms and further illustrating mounting of the cargo cover to the vehicle.

In the event the rear seat "s" is removed or stowed, a rear cross-bar 26 may be secured to the rear side arms 16 spaced from the back end of the vehicle "v" as depicted in FIG. 8. In embodiments, the rear cross-bar 26 is affixed using two bolts 28 which are advanced into pre-drilled holes within the two side arms 16. The rear cross-bar 26 has an internal groove 30 facing the rear of the vehicle "v". The internal groove 30 receives the forward edge of the rear cargo cover 12 in the completely installed position of the rear cargo cover 12, e.g., upon complete sliding movement of the rear cargo cover 12 within the grooves 22 of the side arms 16 to the forwardmost position of the rear cargo cover 12. In FIG. 8, the grooves 22 of the side arms 16 are visible. The rear cross-bar 26 also assists in securing the front cover 14.

Figure 9:
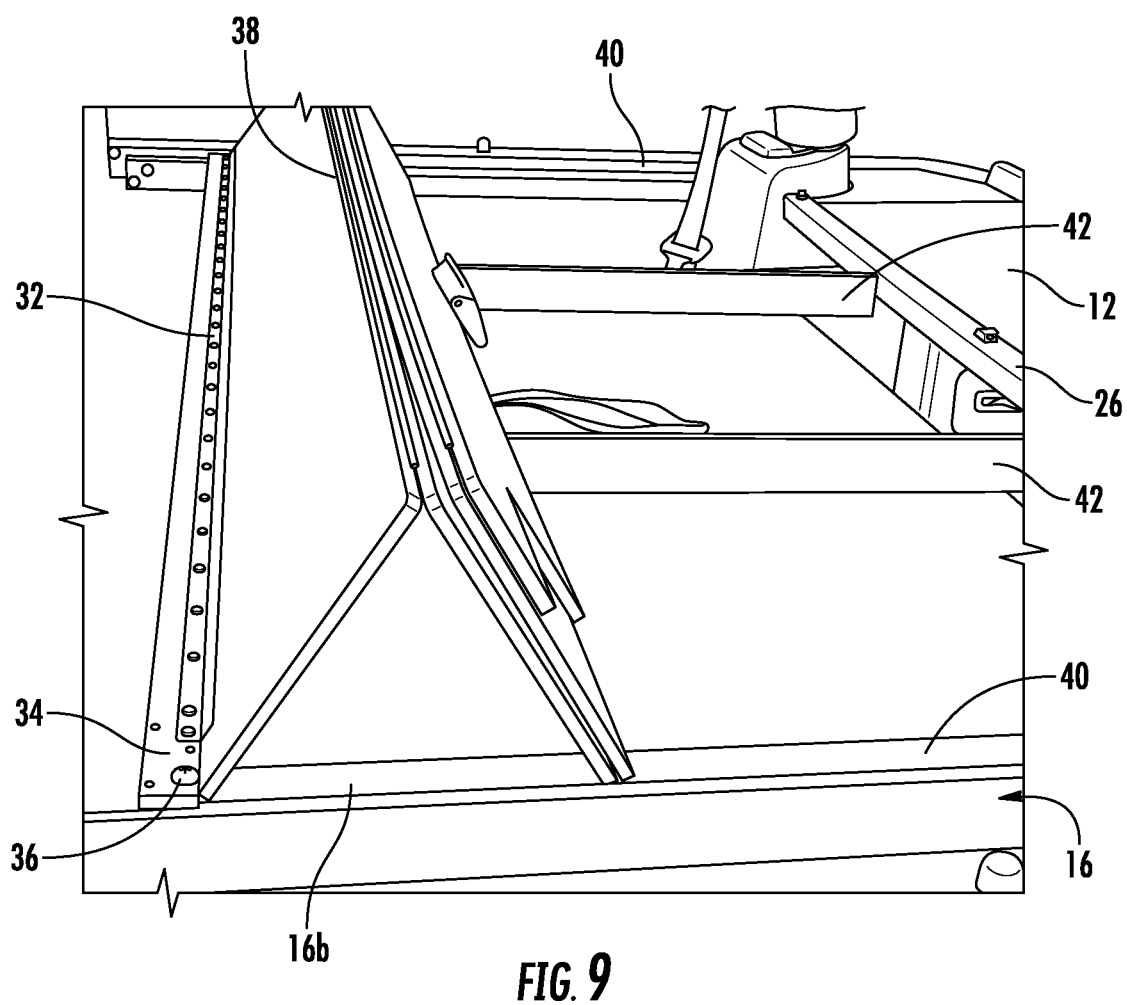
FIG. 9 is a view of the front cross-bar and the front cover mounted to the side arms with the front cover in an at least partially folded condition.

Referring now to FIG. 9, in conjunction with FIG. 3, the installation of the front cover 14 will be discussed. A front cross-bar 32 of the front cover 14 is secured to the forward section 16b of the side arms 16. The two side arms 16 each may incorporate a seating bracket 34 to which the front cross-bar 32 is secured. In one exemplary embodiment, the front cross-bar 32 includes predrilled holes which align with holes of the seating brackets 34 of the side arms 16 to receive bolts 36 (and associated threaded nuts) or the like to secure the front cross-bar 32 to the side arms 16.

The front cover 14 includes a plurality of hinged panels 14a-14d, e.g., four (see also FIG. 3), which are adapted to fold along respective hinges 38, which couple adjacent panels 14a-14d, to permit the panels 14a-14d to transition between a folded condition and an unfolded condition. The forwardmost panel 14a of the front cover 14 is directly secured to the front cross-bar 32 with the use of screws, brackets or the like. In the unfolded condition, the panels 14a-14d extend from the front cross-bar 32 to the rear cross-bar 26 of the assembly 10. The sides of the panels 14a-14d rest on the shelves 40 of the side arms 16 (FIG. 9) when fully installed.

With continued reference to FIG. 9, in conjunction with FIG. 3, the assembly 10 also includes, e.g., three cross-bar support joists 42 spanning the distance between the front cross-bar 32 and the rear cross-bar 26. The joists 42 may include notched areas which respectfully engage the cross-bars 26, 32. Alternatively, the rear and front cross-bars 26, 32 may have slots for reception of the joists 42. The joists 42 will give added strength and stability to the hinged front cover 14 to prevent bowing or bending. It will also allow for light duty objects (i.e., small baskets of footwear/garments or other lightweight items) to be stored/carried directly atop the position of the joists with the carried weight evenly distributed across the joists 42.

Figure 10:
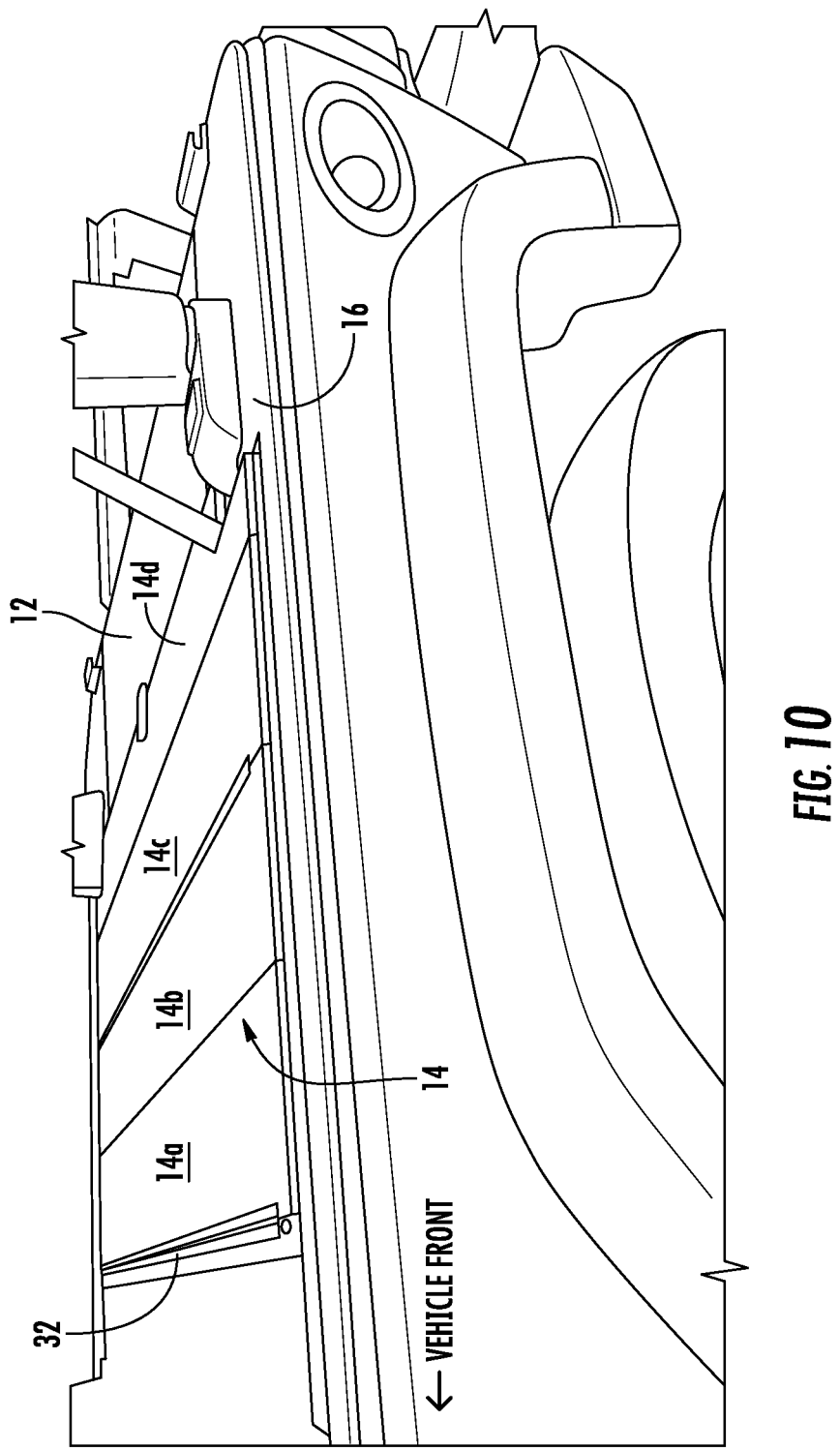
FIG. 10 is a perspective view illustrating the front cover deployed enclosing the rear seat cargo space of the vehicle.
Figure 11A:
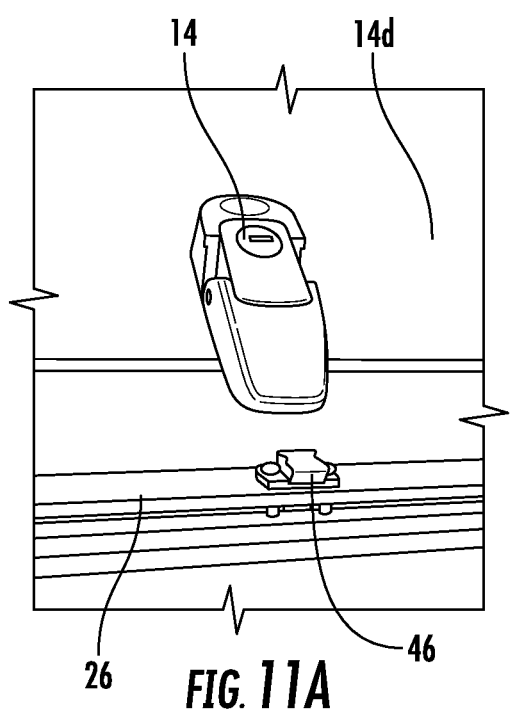
FIGS. 11A-11C are a sequence of views illustrating the use of the lock in securing the front cover relative to the rear cross-bar and the rear cover.
Figure 11B:
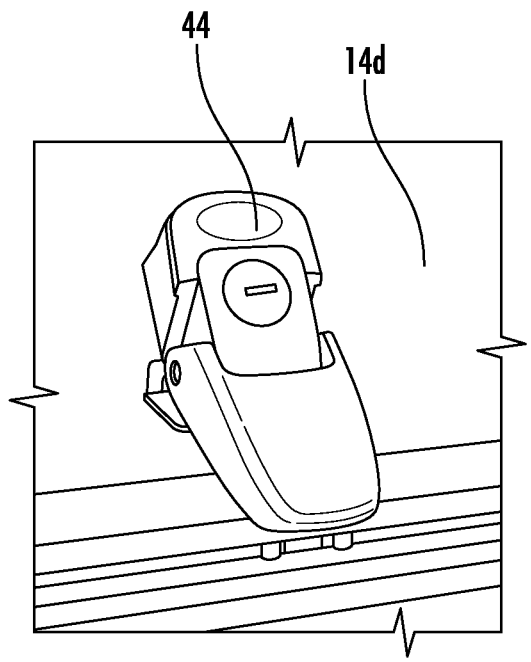
Figure 11C:
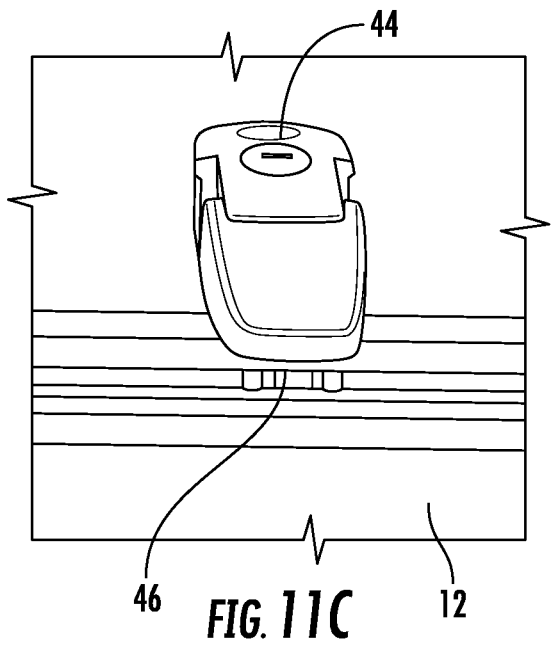

FIG. 10 illustrates the front cover 14 with its panels 14a-14d fully unfolded and extending to the rear cross-bar 26 and the rear cargo cover 12 on top of the joists 42. To secure the rearmost panel 14d and thus the front cover 14, the rear panel 14d includes a lockable latching mechanism 44 (e.g., a lock) which cooperates with the lock shelf 46 either on the rear cargo cover 12 or the rear cross-bar 26 in the manner depicted in FIGS. 11A-11C to secure the rear panel 14d. In the secured position, the panels 14a-14d are locked thereby securing the front cover 14 and enclosing the trunk cargo space.

The front cover 14 in its secured condition functions to enclose the rear seat cargo space of the vehicle from the front seats to the rear tailgate when the rear seat has been stowed or removed. The front cover is secured in front at the front cross-bar 32 and in back by the rear cross-bar 26 and the latching mechanism 44.

Figure 12:
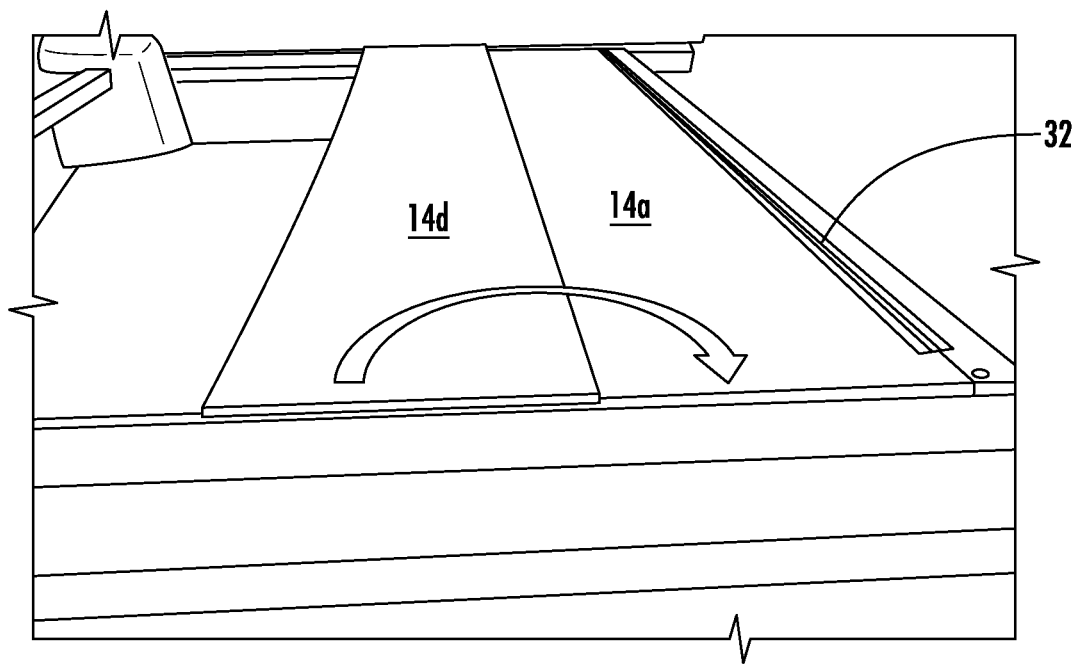
FIG. 12 is view illustrating unlocking of the lock and to gain access to the rear seat cargo space.

FIG. 12 displays the folding feature of the hinged top cover panel 1 as it functions to permit access at distinct and varying points across the panels 14a-14d. Only the rear most panel is folded back in FIG. 11. Each panel 14a-14d may fold forward from vehicle rear toward vehicle front on its own hinge in accordion fashion to allow access to the rear seat cargo space.

It is envisioned that the four bolts used to secure the left and right side-arms 16 to the vehicle need not be removed for any purpose other than discontinuing the use of the assembly altogether. It is further envisioned that the two bolts used to secure the front cross-bar 32 of the hinged front cover 14 to the left and right side arms 16 may be easily affixed and removed as the hinged front cover 14 is needed to secure the larger cargo space when the vehicle's rear seat is either removed or stowed. It is also envisioned that the two bolts used to secure the rear cross-bar 26 to the left and right side arms 16 can also easily be affixed and removed as the rear cross-bar 26 is needed for use when (A) the hinged front cover 14 will be in use or (B) the vehicle's rear seat has been stowed or removed.

Figure 14:
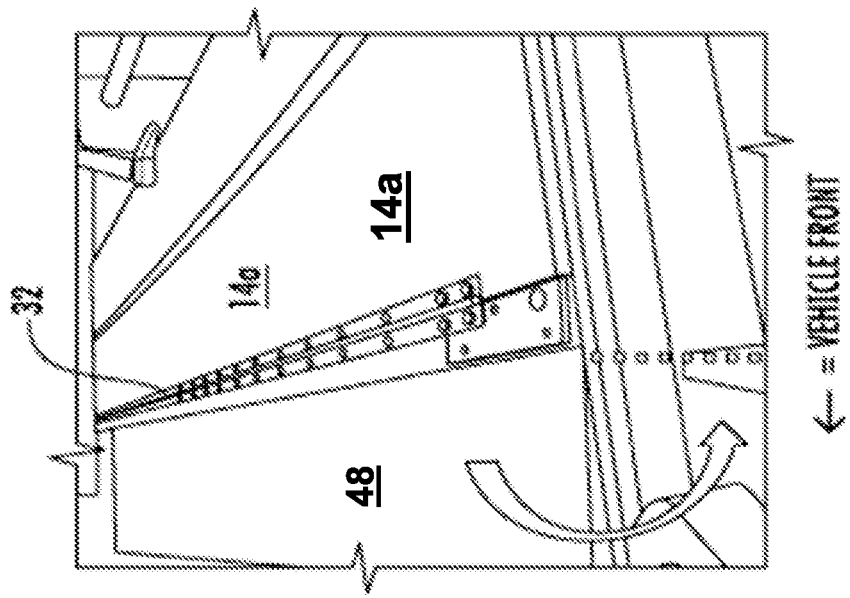
FIGS. 13-14 are perspective views illustrating use of an additional lower panel to secure the front of the cargo space if/when the Jeep® front doors have been removed thereby rendering that portion of the vehicle unlockable.
Figure 13:
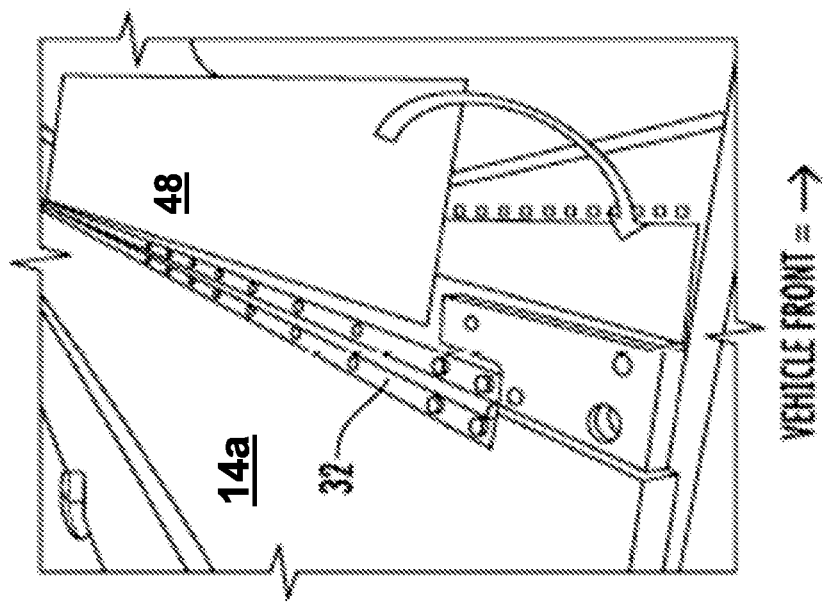

FIGS. 13-14 shows the optional installation and use of the additional lower panel 48 positioned adjacent the front seat cargo space of the vehicle "v". This additional forward panel 48 may be easily affixed by bolting it to pre-drilled holes in the front cross-bar 32. The lower panel 48 will depend, e.g., orthogonally, from the front cross-bar 32 to secure the rear seat cargo space from access from the front of the vehicle. This application would only be necessary when the vehicle's front doors have been removed (which is a common method employed in the use of a Jeep® vehicle).

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An enclosure assembly for a vehicle, which comprises:
   first and second side arms, each side arms configured to be coupled to sides of a vehicle;
   a cover configured for installation adjacent a rear space of the vehicle, the cover configured to be coupled to the first and second side arms to at least partially close the rear space; and
   a lower panel coupled to the cover and configured to prevent frontal access to the rear space of the vehicle when doors of the vehicle doors are removed.

2. The enclosure assembly according to claim 1 wherein at least portion of the cover is foldable to permit transition between a folded condition permitting at least partial access to the rear space of the vehicle and an unfolded condition minimizing access to the rear space of the vehicle.

3. The enclosure assembly according to claim 2 wherein the cover includes a plurality of panels having adjacent panels foldably connected to each other to permit transition between the folded condition and the unfolded conditions.

4. The enclosure assembly according to claim 1 wherein the lower panel is coupled to a forward end of the cover and depends downwardly relative to the cover.

5. The enclosure assembly according to claim 3 wherein the cover comprises a front cover portion configured for installation adjacent a seat space of the vehicle and a rear cover portion configured for installation adjacent a trunk cargo space of the vehicle.

6. The enclosure assembly according to claim 5 wherein the front cover portion comprises the plurality of panels having the adjacent panels foldably connected to each other.

7. The enclosure assembly according to claim 6 wherein at least one of the front cover portion and the rear cover portion are configured to be coupled to the first and second side arms.

8. The enclosure assembly according to claim 7 including a locking mechanism for operatively securing the front cover portion relative to the rear cover portion.

9. The enclosure assembly according to claim 8 wherein the locking mechanism is configured to preventing movement of the front cover portion to the folded condition.

10. An enclosure assembly, which comprises:
    first and second side arms, the side arms configured to be secured to respective sides of a vehicle, the side arms each defining internal grooves; and
    a rear cargo cover having edges correspondingly dimensioned to be received within the internal grooves of the first and second arms, the rear cargo cover slidably mounted relative to the first and second arms via reception of the edges of the rear cargo cover and the internal grooves of the first and second arms to permit movement of the rear cargo cover between a rear open position permitting access to a trunk cargo space of the vehicle and a forward closed position enclosing the trunk cargo space.

11. The enclosure assembly according to claim 10 including a rear cross-bar mountable to the first and second arms, the rear cross-bar defining an internal groove configured for reception of a forward edge of the rear cargo cover.

12. An enclosure assembly, which comprises:
    first and second side arms, the side arms configured to be secured to respective sides of a vehicle; and
    a forward cover operatively couplable to the side arms of the vehicle, the forward cover including a plurality of panels, adjacent panels foldably connected to each other to permit transition of the forward cover between a folded condition permitting at least partial access to the rear space of the vehicle and an unfolded condition minimizing access to the rear space of the vehicle.

13. The enclosure assembly according to claim 12 including a forward front crossbar, the forward front cross-bar securable to a panel of the forward cover and to each of the first and second arms.

14. The enclosure assembly according to claim 13 including a lower panel coupled to the forward cover and configured to prevent frontal access to the rear space of the vehicle when doors of the vehicle doors are removed.

15. A method for securing a vehicle cargo area of a vehicle and having a top of the vehicle, comprising the steps of:
    securing first and second side arms of a vehicle closure assembly to respective sides of the vehicle; and
    mounting a cover to the first and second side arms to at least partially close rear space of the vehicle, the cover includes a front cover portion configured for installation adjacent a seat space of the vehicle and having a plurality of panels foldably connected to each other and a rear cover portion configured for installation adjacent a trunk cargo space of the vehicle;
    transitioning at least the front cover portion between a folded condition permitting at least partial access to the rear space of the vehicle and an unfolded condition minimizing access to the rear space of the vehicle; and
    securing the cover in the unfolded condition by securing the front cover portion to the rear cover portion with a locking mechanism.

16. The method of claim 15 wherein securing the first and second arms includes passing fasteners through openings in the side arms and through openings on the sides of the vehicle.

17. The method of claim 15 wherein the rear cover portion includes a rear cover panel having a rear cross-bar mountable to the first and second arms, the front cover portion secured to the rear panel with the locking mechanism.

18. The method of claim 17 wherein the rear cross-bar defines an internal groove configured for reception of a forward edge of the rear cover panel.

\* \* \* \* \*